United States Patent
Neogi et al.

(10) Patent No.: US 8,001,093 B2
(45) Date of Patent: Aug. 16, 2011

(54) PURGING OF STORED TIMESERIES DATA

(75) Inventors: Anindya Neogi, New Delhi (IN); Ravi Kothari, New Delhi (IN); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 12/061,730

(22) Filed: Apr. 3, 2008

(65) Prior Publication Data

US 2008/0183778 A1 Jul. 31, 2008

Related U.S. Application Data

(63) Continuation of application No. 11/562,541, filed on Nov. 22, 2006, now abandoned.

(51) Int. Cl.
*G06F 17/00* (2006.01)
*G06F 17/30* (2006.01)
*G06F 1/00* (2006.01)

(52) U.S. Cl. ......... 707/692; 707/755; 707/756; 713/500

(58) Field of Classification Search ........... 707/999.001, 707/999.003, 999.1, 692, 755, 756; 706/12, 706/47, 58; 713/500
See application file for complete search history.

(56) References Cited

U.S. PATENT DOCUMENTS

| | | | |
|---|---|---|---|
| 6,587,127 B1 * | 7/2003 | Leeke et al. | 715/765 |
| 6,779,030 B1 | 8/2004 | Dugan et al. | |
| 6,915,435 B1 | 7/2005 | Merriam | |
| 7,254,581 B2 * | 8/2007 | Johnson et al. | 707/627 |
| 7,370,057 B2 * | 5/2008 | Burdick et al. | 707/692 |
| 2002/0065459 A1 * | 5/2002 | MacAdam et al. | 600/424 |
| 2004/0236748 A1 * | 11/2004 | Coltrera | 707/9 |
| 2004/0267704 A1 * | 12/2004 | Subramanian et al. | 707/3 |
| 2005/0086242 A1 * | 4/2005 | Ngai et al. | 707/100 |
| 2005/0187940 A1 | 8/2005 | Lora et al. | |
| 2006/0248026 A1 * | 11/2006 | Aoyama et al. | 706/12 |
| 2008/0114571 A1 * | 5/2008 | Campbell et al. | 702/189 |

OTHER PUBLICATIONS

Neogi, et al., U.S. Appl. No. 11/562,541, IN920060007US1, Office Action Communication, Jul. 20, 2009, 11 Pages.
Svobodova, L., *A Reliable Object-oriented Data Repository for a Distributed Computer System*, IEEE/ACM Digital Library, Record No. xxx, 1981.

(Continued)

*Primary Examiner* — Mohammad Ali
*Assistant Examiner* — Bao G Tran
(74) *Attorney, Agent, or Firm* — Gibb I.P. Law Firm, LLC; Derek S. Jennings

(57) ABSTRACT

There is disclosed methods, systems and computer program products for purging stored data in a repository. Users attach relative importance to all data samples across all timeseries in a repository. The importance attached to a data sample is the 'utility value' of the data sample. An algorithm uses the utility of data samples and allocates the storage space of the repository in such a way that the total loss of information due to purging is minimized while preserving samples with a high utility value.

20 Claims, 6 Drawing Sheets

OTHER PUBLICATIONS

Stolte, E. et al, *Scientific Data Repositories—Designing for a Moving Target*, IEEE/ACM Digital Library, Record No. xxx, 2003.

Andrade, H. et al, *Active Proxy-G: Optimizing the Query Execution Process in the Grid*, IEEE/ACM Digital Library, Record No. xxx, 2002.

McCann, R. et al, *Mapping Maintenance for Data Integration Systems*, Proc 31st VLDB Conference, Trondheim, Norway, 2005.

Saito, Y. et al, *Optimistic Replication*, IEEE/ACM Digital Library, Record No. xxx, 2005.

Blumenthal, U. et al, *Classification and computation of dependencies for distributed management*, Proc. of 5th IEEE Symposium on Computers and Communications, France, Jul. 2000.

Urgaonkar U. et al, *An analytical model for multi-tier internet services and its applications*, in Sigmetrics, 2005.

Agarwal, M.K. et al, *Mining activity data for dynamic dependency discovery in e-business systems*, IEEE eTransactions in Network and Service Management, 1(2), Dec. 2004.

\* cited by examiner

PURGING OF STORED TIMESERIES DATA

CROSS-REFERENCE TO RELATED APPLICATIONS

This application is a continuation of U.S. application Ser. No. 11/562,541 filed Nov. 22, 2006, the complete disclosure of which, in its entirety, is herein incorporated by reference.

FIELD OF THE INVENTION

The present invention relates to purging of stored timeseries data.

BACKGROUND

In enterprises with a large IT infrastructure, monitoring of infrastructure elements (servers, applications, network elements and so on) is necessary to ensure that an infrastructure problem is detected as quickly as possible. Some examples of monitored entities include the latency of a process, the availability of a server and the throughput of an application. The data resulting from the monitoring activity typically is stored in a repository and can be used for measuring service level agreements (SLA) compliance, such as measuring average SLA performance, problem determination, capacity planning etc for business intelligence (BI) processes.

The monitoring data is in the form of a set of timeseries, with one timeseries for each independently identifiable measurement (e.g., response time measurement of a component is one timeseries and throughput measurement at the same component is another timeseries, even though they may be related in some manner.) A timeseries records either uniformly sampled real valued measurements (hereinafter called a measurement timeseries), or a non-uniform Boolean signal denoting either normal or problem state of a monitored entity which is called an event timeseries. The event timeseries may be generated by applying conditions (such as a threshold comparison) on a measurement timeseries or by the data sensors themselves.

Monitoring data usually is stored in a data repository. The size of the monitoring data within the repository increases with continuous addition of samples to these timeseries, leading to increasing storage hardware cost and more importantly data management cost. Data repositories also usually have a maximum capacity that places an absolute limit on the number of monitoring data samples that can be stored. Entries in the monitoring data repository thus need to be purged periodically to reduce these costs. The prevalent approach to managing the size of the repository is time-based purging, i.e., data originating prior to a threshold date are deleted. Notwithstanding low computational overhead and ease of implementation, time-based purging leads to a significant and abrupt loss of BI.

To illustrate the abrupt loss of BI, consider an example where the failure of a process not only generates an 'non-availability of process' event, but also causes cascaded non-availability events at application and business-function levels. The throughput and the queue length data associated with the process also capture the adverse impact of the process failure. All of these events typically occur within a short period of time. Time-based purging will simultaneously target all these events as candidates for purging and the knowledge of the occurrence of the episode will be lost. A time-based purging mechanism, such as taught in U.S. Pat. No. 6,915,314 (Jackson et al, assigned to Adtech-Geci, LLC) issued on Jul. 5, 2005, will ignore all these inherent relationships in the recorded data samples. It will delete all the samples before a certain threshold time, compromising the richness of any subsequent audits or analysis.

Another approach is taught in US Patent Publication No. 20020065974 (Thomson, Chad) published on May 30, 2002. Thomson's technique provides a mapping table that indicates different rules for purging and/or archiving different database tables. Each rule is associated with a different database table. The rules are applied to purge and/or archive data from the different database tables.

Therefore, it is an object of the invention to alleviated one or more of the above mentioned disadvantages.

SUMMARY

This invention, in broad terms, implements a purging algorithm in which:
1. Users (i.e., humans or computer programs) can attach relative importance to all timeseries data samples across all timeseries in a repository. The importance attached to a data sample is referred to as the 'utility value' of the data sample.
2. The algorithm uses the utility of data samples and allocates the storage space of the repository in such a way that the total loss of information due to purging is minimized while preserving samples with a high utility value.

Example embodiments are based upon relationships between timeseries, regions of interest and the age of the data samples. One or more of these mechanisms could be used simultaneously.

A mechanism is provided to minimize the information loss while purging the data samples using the utility values attached to the data samples. Information loss is estimated form the actual values of the timeseries data samples.

BRIEF DESCRIPTION OF THE DRAWINGS

Aspects of the present invention will now be described, by way of example only, with reference to the accompanying drawings, in which.

DETAILED DESCRIPTION

Figure 1:
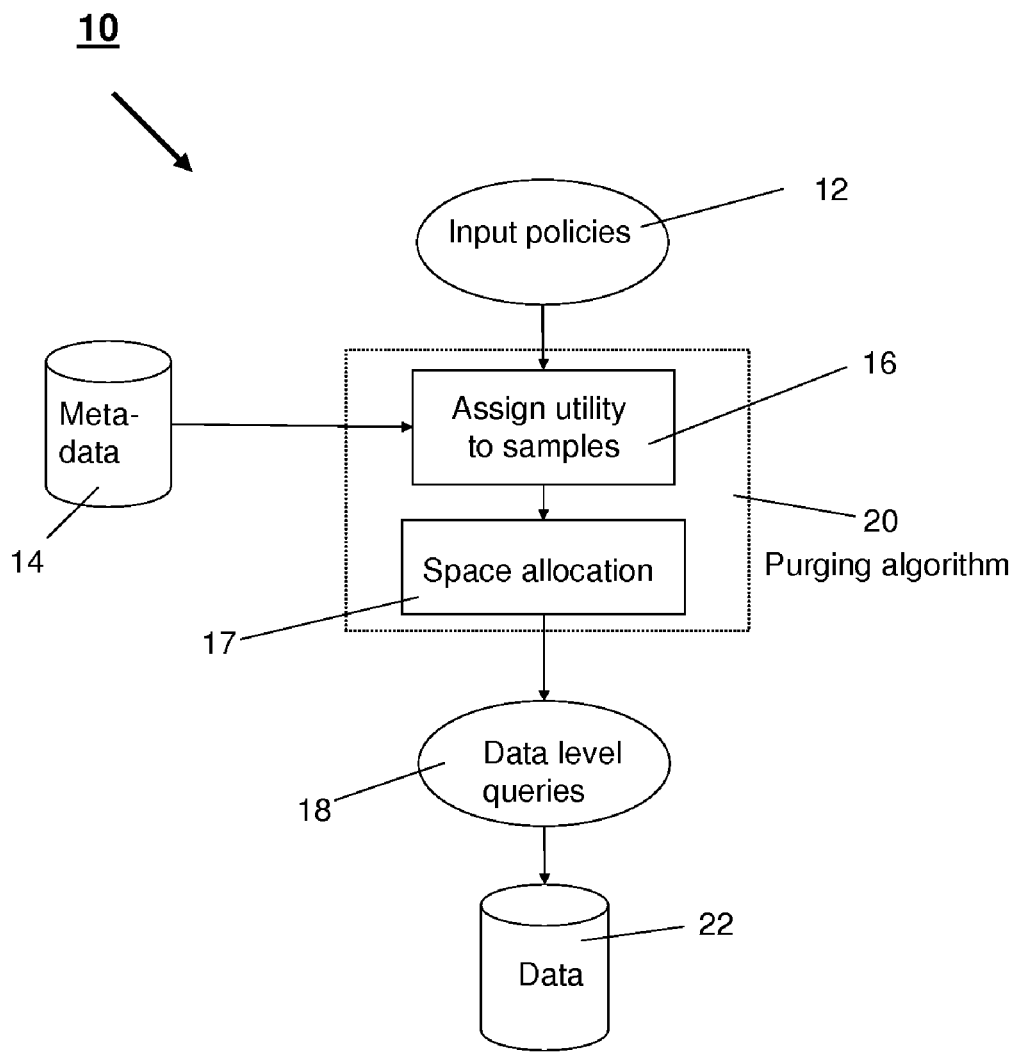
FIG. 1 is a schematic flow diagram of the broad method embodying the invention.

Where reference is made in any one or more of the accompanying drawings to steps and/or features, which have the same reference numerals, those steps and/or features have for the purposes of this description the same function(s) or operation(s), unless the contrary intention appears.

The expression "purging" is to be understood as synonymous with "delete" and "remove", and other equivalent expressions that would be apparent to a person skilled in the art.

Overview

The flowchart of FIG. 1 shows a purging method 10 broadly embodying the invention.

The purging method is a two step process. In the first step 16, utility values are attached to all data samples in a repository 22. Models are used to attach utility values. The models are stored in a meta-data repository 14. These models capture relative importance between data samples belonging to different timeseries and the relative importance of data samples within the same timeseries. Three model embodiments are:

1) Relationships between timeseries: there exist many type of relationships, correlation between timeseries, i.e., one timeseries is affected by another timeseries, root cause effect, i.e., events in a timeseries are caused due to events in another timeseries, derived timeseries, e.g., an event timeseries is derived from a measurement timeseries by thresholding the latter. Another relationship could be structural, an IT component that is being monitored could be part of an application which itself could be part of a business. A timeseries that is measure at the IT component level would be related to timeseries at the business level. The BI derived from a set of related timeseries would obviously depend upon the relationships in the set.

2) Regions of interest in a timeseries: some data samples in a timeseries may be in the temporal neighbourhood of an actual alert or event condition in the system. These neighbouring values would be highly correlated with the event; hence would provide important BI with respect to event/alert conditions.

3) Age of data samples in a times series: data samples in a timeseries that are older may not provide as much BI as data that is current.

In the second step 17, the utility values generated by step 16 are used to purge data samples so that the space constraint is met, such that the purging of the data samples leads to minimum loss in information, while ensuring that samples with high utility are preserved. Information in data samples is estimated using information theoretic methods from the sample values. Thus, while 'utility' captures the user's interest in a data sample, the information loss metric captures the data characteristics, e.g. its magnitude, its deviation from mean value, etc. The information loss metric will be provided by the user and has to be related to the nature of BI that the user wants from the repository 22. Thus, minimizing information loss implies that the BI is meaningful.

Traditional purging systems operate only by using data level queries. The user of these systems needs to frame a data level query to delete samples in the repository. However, in the present purging algorithm 20, the user can provide higher level policies 12 as inputs and these are translated by the above two steps 16, 17 into actual data level deletion queries 18 on the repository data 22.

A pseudo-code representation of the purging algorithm is:
1. For each timeseries
   a. For each data sample in timeseries
      b. Attach a utility (either explicitly or indirectly through the model specification) numerical value to the data sample
2. Allocate a space constraint: number of samples to be purged in the repository
3. Define an information loss metric
4. For all the samples in the repository estimate the information loss in purging sample
5. Find the samples that have the lowest information loss and the lowest utility value attached. Purge these samples such that the repository capacity is not exceeded.

System Embodiment

Figure 2:
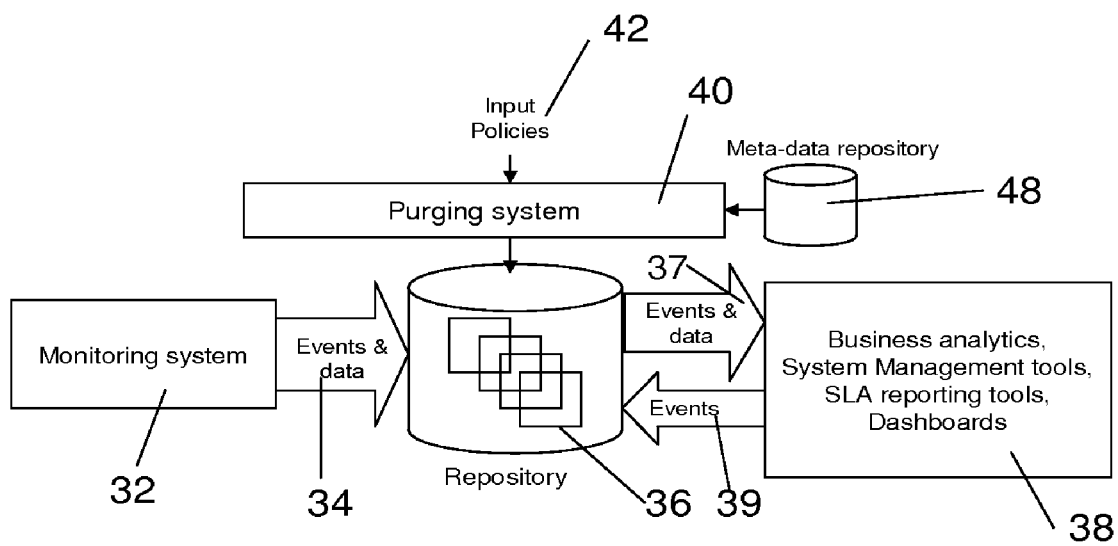
FIG. 2 is a schematic block diagram representation of a purging system according to an embodiment of the invention.

FIG. 2 shows a purging system 30 of an example embodiment. The monitoring system 32 collects data from the managed computer system/s (not shown), consisting of applications and infrastructure components (such as servers, storage, and network elements). The monitoring system 32 also may perform computations on the collected data to generate "events" that signify certain conditions where observed in the collected data. The monitored data and events 34 are stored in a repository 36. The repository 36 may have an internal schema that is open, and/or the repository allows access through published APIs. Events and data information 37 from the repository 36 is passed to an analytics module 38. The analytics module 38 performs analyses such as business analytics, system management tools, and service level agreement reporting tools. The analytics module 38 also may generate events 39 that are to be stored in the repository 36.

A purging module 40 receives input policies 42. These policies specify the necessary parameters to realize particular instances of the models in the meta-data repository 48. For example, a sample policy is as follows:

"The utility of throughput measurement timeseries of 'Billing' application is 50% of its antecedent timeseries at the end of the mandatory audit period. Thereafter, the value diminishes linearly with slope 0.5. Data samples within two sample neighbourhood of any throughput related event are twice more valuable than any other farther sample in the same timeseries."

The purging system 40 translates these high level utility based specifications to actual data level database schema-specific deletion queries and their execution schedule. A meta-data repository 48 stores the models described below in the model embodiments. The input policies 42 are based on the models defined in the meta-data repository 48. For example, if an ageing model is defined in the meta-data repository 48, then input policies are used to configure the parameters, such as linear model, slope, and time window. Also, for example, if relationship models are to be used, then relative importance weights between measurement timeseries can be assigned by the policy.

Model Embodiments

The models defined on data generated by the monitoring system 32 will now be described. These models are used by the purging module 40 to implement the purging algorithm 20.

Each of the N data measurements, such as raw data sensors, data aggregators, or event monitors in the monitoring system 32 produces a timeseries $R_i$ that contains data samples $r_{ij}$ for $i=1 \ldots N$ and $j=1 \ldots S_{it}$, where $S_{it}$ is the size (number of samples) of the timeseries at time instance t.

Dependency Model

The first model embodiment captures relationships between timeseries. Each timeseries has additional information or meta-data associated with it. The meta-data types may need to be customized to the actual domain but should be largely unchanged across domains. Meta-data type always includes 'metric', i.e., the quantity being measured, and the context in which the measurement is taking place, e.g., contexts may be, 'business function', 'geographical location', 'application', etc. These meta-data types are defined in a monitoring ontology such as CIM (see http://www/dmtf.org). Several types of relationship or dependency models can be defined for such meta-data. These in turn induce dependency relationships between the actual timeseries data. More specifically, combinations of structural, functional, computational, and metric relationships between pairs of timeseries can be considered.

The dependency model specifies a static hierarchy on the meta-data to capture the structural context; an example of a hierarchy is:

---
<metric type M>/<line of business LOB>/<business function BF>/ <geography GEO>/ <application component AC>/<infrastructure resource IR>
---

Each meta-data type above can itself be hierarchically structured. The hierarchy can be encoded as a string tag for each measurement timeseries and corresponding event timeseries. Example timeseries tags for, say, monitoring of a financial institution data center, could be:
    <availability/link>/<creditcards>/<billing>/<EMEA>/
        <printBill/processA>/<server1> and
    <qsize>/<creditcards>/<billing>/<EMEA>/<printBill/
        processA>/<server1>.

The dependency model also contains metric relationships between metadata that cannot be captured in the hierarchy and hence are not part of the timeseries tags. In the above example, the model may dictate that availability/link measurement of printBill application on server1 is an antecedent of the qsize measurement on the same entity, because queue size will be impacted by availability. These relationships can be represented as cross-edges between the meta-data of two tag hierarchies, assuming that they encode only causal information for ordering and do not produce any cycles in the resulting dependency graph. The metric relationship is represented between the applicable levels of the two hierarchies, e.g., a metric relationship specified at the billing level means that if the two timeseries' exist at the business function level, then they are related. No assumption is made currently about relationships at other levels unless explicitly specified.

Similar to metric relationships, functional relationships are also cross edges. However, they are not represented explicitly in the dependency model. A functional relationship only becomes important when it manifests as a metric relationship, e.g., application printBill may depend on another application getAddress for some service. But then the dependency may appear as a metric relationship between latency measurements at printBill and getAddress.

The dependency model described so far creates a directed acyclic graph (DAG) of meta-data instances. Each timeseries is associated with a node in the DAG and corresponds to a specific tag created by the hierarchy from the hierarchy root to the specific node. The structural and computational dependencies are explicitly captured in the tag hierarchy, and the metric (or indirectly functional) dependencies are edges connecting two tags at some hierarchy levels. For the purpose of this discussion we assume that if a dependency model is used for computing utility values of data samples, then the DAG edges in the instance of the model are known using some technique.

The hierarchical dependency model also covers computational dependencies, such as aggregation and event generation. For example, a measurement timeseries with tag <qsize>/<creditcards>/<billing>/ is an aggregation of all measurement timeseries for various geographies under the billing business function. Also, any event timeseries E is an antecedent to its corresponding measurement timeseries, M, (from where it is computed), and any dependent timeseries of M.

The analytics module 38 that consumes the raw event and data 37 can generate higher level events which have tags that are prefix of the consumed data. For example, the analytics module 38 may consume system component instance level availability information, with tags of the form <M>/<LOB>/ <GEO>/<AC> and generate business function level availability events with tags of the form <M>/<LOB>. In this case, the analytics module 38 internally implements aggregation functions to summarize information in a hierarchy. The aggregation function must be stored in the meta-data repository 48 so that the purging system can remove high resolution information in a tag hierarchy rooted at node X and maintain only coarse aggregate represented by X.

Ageing Models

Ageing models corresponding to nodes in the DAG also are considered. Historical data usage analysis can be applied to create the models. Aging models can be based on polynomic functions. For example, all data with a business function level tag <latency>/<creditcards>/<billing> can have a linear aging model but more detail data with tag <latency>/<creditcards>/<billing>/<EMEA> can be aged exponentially if it is less valuable for long-term BI. Intermediate functions also can be used.

Region of Interest Models

Assume that there is a measurement timeseries M and a corresponding synchronized and correlated event timeseries E. The correlation between the two timeseries is established using some method that is beyond the scope of this discussion. It is possible that the relationship model DAG represents the relationship between M and E because they are attached to corresponding antecedent and dependent nodes, respectively.

In the region of interest model it is assumed that the utility of data samples in the measurement series is a function of the corresponding synchronized event timeseries. For example, data samples in the measurement timeseries that are closer to an event in the event timeseries can have a higher utility than those that are farther away. The ROI around an event e can be modeled by a bell shaped function with peak at the time where e occurred.

In summary, the meta-data repository 36 stores:
1. Hierarchical meta-data tags
2. Models on the meta-data tags consisting of structural, functional, computational, and metric relationships. These can be represented/stored as a DAG
3. The aggregation function used at each level of the hierarchy to summarize the data that is tagged with its children tags
4. Ageing models associated with each node of the DAG.
5. Region of Interest models associated with each node of the DAG.

Purging Algorithm Embodiment

The total size of the repository 36 at instance t is $S_t = \Sigma_i S_{it}$, based on the notation stated earlier. The goal of the purging algorithm at instance t is to purge B data samples to satisfy the storage constraint.

To formulate this problem, assume that there exists a function u( ) that measures the utility of a data sample $r_{ij}$, which is the $j^{th}$ sample of the $i^{th}$ timeseries. Also, let d(x,y) be a function that measures the change in information content if data sample x is represented by y. Also assume an indicator variable $s_{ij} \in \{0,1\}$, where $s_{ij}=1$ represents that a sample $r_{ij}$ is preserved. Then the purging problem is to minimize the weighted loss in information, where weights are the utility values, under the constraints of desired repository size:

$$\min_{s_{ij}} \sum_{t=0}^{N} \sum_{j=0}^{S_{it}} (u(r_{ij}) * d(r_{ij}, s_{ij} * r_{ij})) \quad (1)$$

such that:

$$\sum_{t=0}^{N} \sum_{j=0}^{S_{it}} s_{ij} = S_t - B \quad (2)$$

This optimization can be formulated as a binary knapsack problem which is known to be NP complete. The purging algorithm does not attempt to solve the problem optimally because of its complexity. Rather, it adopts a divide and conquer approach that drastically reduces the algorithm complexity.

The algorithm assumes that a timeseries can be segmented into time windows of fixed size. In an extreme case the window can cover the entire time length of the timeseries stored in the repository. It is also assumed for simplicity that the window boundaries of all the timeseries' in the repository are synchronized, i.e. there data samples are also synchronized in time.

Before providing the algorithm, the function u( ), which captures cumulative utility of a data sample based on one or more model embodiments, and the information metric d( ), that measures the loss in information due to purging will be discussed.

Utility Contribution from Relationship Model

The first step of the utility computation algorithm is to attach a utility factor $u_c(i)$ to each node i of the DAG. This utility captures the importance of a timeseries with respect to other timeseries without taking the actual data samples of the timeseries into consideration. Thus all data samples belonging to timeseries i will have the same utility $u_c(i)$. The DAG could be used to guide the estimation of $u_c(i)$, e.g., a timeseries is more important than another if it is an antecedent in the relationship. It can be estimated using data analysis techniques, e.g., using historical data usage patterns, but in the current embodiment it is a user input.

Utility Contribution from Ageing Model

In addition, each node i of the DAG is associated with an aging model, $m_i^t(j)$ captures the purging in temporal space which is a generalization of traditional time-based purging. In the latter case $m_i^t(j)=0$ if t>T and 1 if t<T, where T is the time-based purging threshold. In effect, the factor $u_c(i)$ is used to modulate the ageing model that is attached to the node.

$$u(r_{ij}) = u_c(i) * m_i^t(j) \quad (3)$$

An interpretation of this equation could be that $u_c(i)$ attaches an initial monetary value to a timeseries and this value reduces as the data sample ages.

Utility Contribution from Region of Interest Model

Let us assume that an event occurs at time instance $j_e$, then using the Fisheye model the utility factor can be changed as $$u(r_{ij}) = u(r_{ij}) - \text{dist}(j, j_e) \quad (4)$$

where dist( ) is the Euclidean distance measure. The utility of a data sample can be potentially influenced by multiple events in range.

Figure 3:
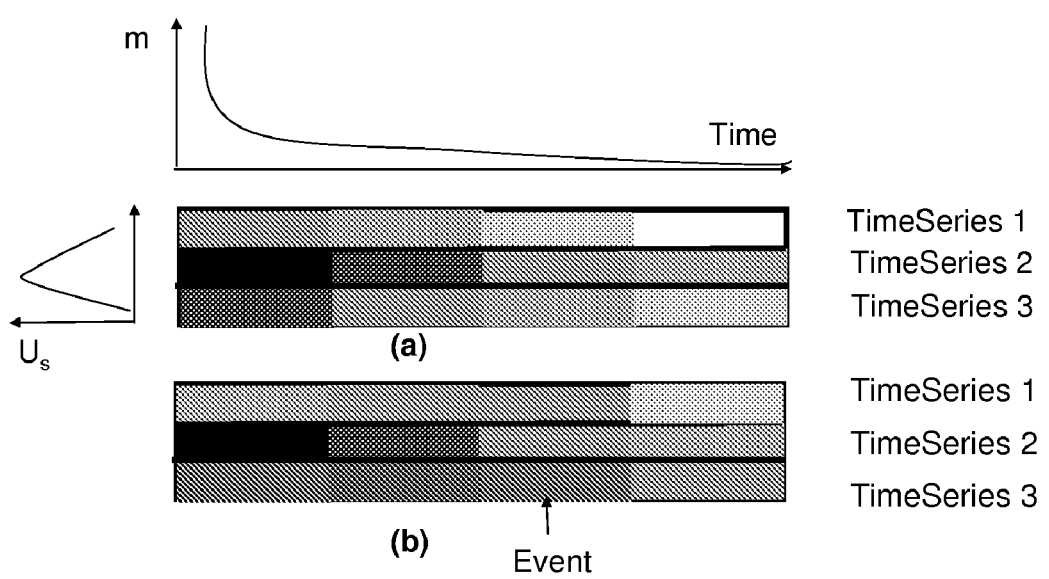
FIG. 3 is a diagram showing how the algorithm attaches utility to a data samples.

FIG. 3 shows an example of the utility computation using the three model embodiments. The shading of the box represents 'utility value'. The higher is the value, the darker the shade. There are three timeseries, of four samples each in the data repository 36. Each sample has a utility factor that is a function of the timeseries it belongs to, $u_c$. There is a common aging model m. In "(a)" it is assumed that no event has occurred, the timeseries only records measurement data. Thus data sample 1 in timeseries 2 has the highest utility factor while data sample 4 in timeseries 1 has the lowest utility factor. On the other hand in "(b)" it is assumed that an event has occurred in timeseries 3 of the repository. It is also assumed that this timeseries is related with timeseries 1. This event changes the utility of the samples in timeseries 1 and 3, giving higher importance to the event sample and its immediate neighbors while lessening the importance of other samples.

Information Loss Metric

Different information measures can be used in the purging algorithm. All such measures are estimated from the actual values of the timeseries data. The measure chosen should depend on the expected BI usage of the preserved data. For example, if point queries of the form "find records at time instant t" are expected then $d(x, y)=|x-y|^n$. On the other hand if range queries of the form "find statistics of records in the time range $t_1$ to $t_2$" are expected then the difference in the statistics of the samples in the time range are of concern, e.g. the probability distribution function (PDF) of original sample set and the purged set should be close.

If point queries are predominant then Mean Square Error (MSE) is used as the distortion measure evaluating the effectiveness of the algorithm. If range queries are predominant then Kullback Liebler (KL) distance is used as a distortion measure. Depending on the information loss metric, a statistics of the data samples would be chosen to be preserved, e.g., if MSE has to be minimized, then variance of samples would be used as the statistics, while if KL has to be minimized, the histogram will be used as statistics.

Purging Algorithm

The algorithm adopts a greedy approach where the timeseries' are segmented into windows. The windows of all timeseries' are synchronized with equal number of synchronized samples in them.

For example, the purging algorithm in one embodiment is configured to:

1. compute statistics and average utility:
    (a) for each window w of timeseries i:
        i. calculate statistics of the data samples in the window $d_w(i)$, e.g. calculate the variance, entropy, or the histogram of values. (The statistics here represent the information content).
        ii. find average utility $u_w(i)$ of the data samples in the window.
2. select number of samples to be preserved:
    (a) the number of samples to be preserved, $b_w(i)$, in window w is in proportion to the statistics of a window and its average utility, i.e., $$b_w(i) = \frac{u_w(i) * d_w(i)}{\sum_w u_w(i) * d_w(i)} * B \quad (5)$$

This involves rounding fractional values to integer allocations.

3. select samples:
    (a) for each window w of timeseries i:
        i. compute histogram on the time axis.
        ii. distribute $b_w(i)$ among the bins on the time axis in ratio of the time axis histogram frequencies.
        iii. within a histogram bin select samples uniformly.

A few assumptions are made in the above algorithm embodiment:
1. It is assumed that "bits", i.e., the number of samples to be preserved in a window, can be allocated in proportion to the average information content and average utility of samples in the window. This assumption has often been used in data compression area and is optimal if the signal was a Gaussian and MSE was being preserved.
2. In the selection of samples, the data samples in a window are chosen uniformly from clusters in time, with the number of samples being proportional to the size of the cluster. Clearly more sophisticated techniques could be substituted in any of the steps of the algorithm; there is a loss of algorithmic performance (in terms of measure being preserved) due to these assumptions but it is a tradeoff with the time complexity.

Results

Experiments were performed on a data set with 8 timeseries with 10,000 samples in each. They correspond to availability, input load, queue size, and throughput measurements at 2 processes belonging to an application. The timeseries were independent of each other and had equal importance, i.e. $u_c$ was equal for all. An exponential aging model was used along with a bell shaped region of interest model.

Figure 4A:
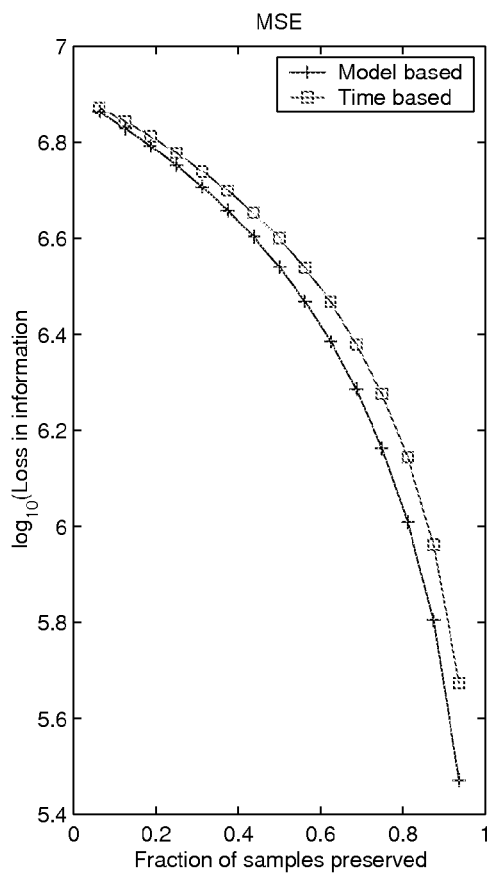
FIGS. 4A, 4B and 4C are results graphs showing the performance of the model based purging algorithm compared with time based purging for MSE as the information loss measure.

FIG. 4A shows the performance of a purging algorithm where y-axis is the 'mean of $\log_{10}$ (loss in information)' and x-axis is the 'fractional number of samples preserved'. The plot for time-based purging and the proposed model-based purging are shown. The model-based purging algorithm performs better because it shows lower loss in information with the same repository size.

Figure 4B:
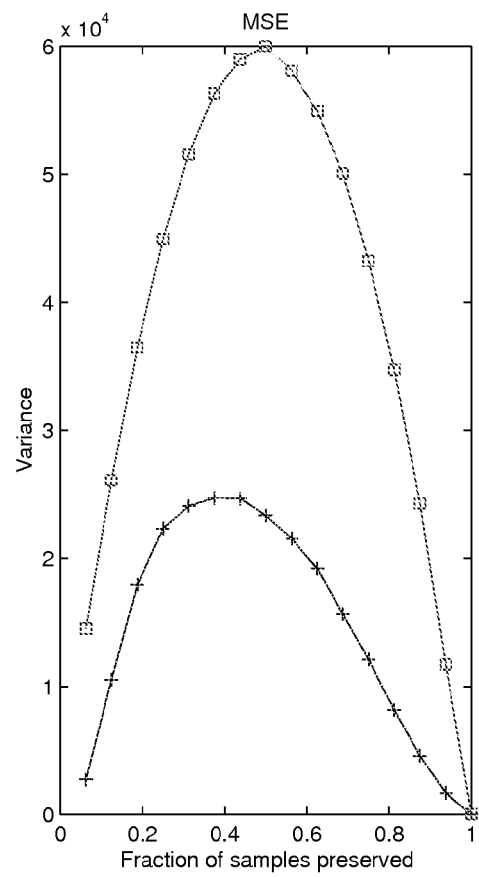

FIG. 4B shows the performance of a purging algorithm where y-axis is the 'variance of $\log_{10}$ (loss in information)' and x-axis is the 'fractional number of samples preserved'. Again both time-based and model-based algorithm curves are plotted. The variance in information content for model-based purging is much lower given the same repository size. Also, the change in variance with repository size is flatter and smoother demonstrating that model-based purging not only causes lower variance but a smoother degradation.

Figure 4C:
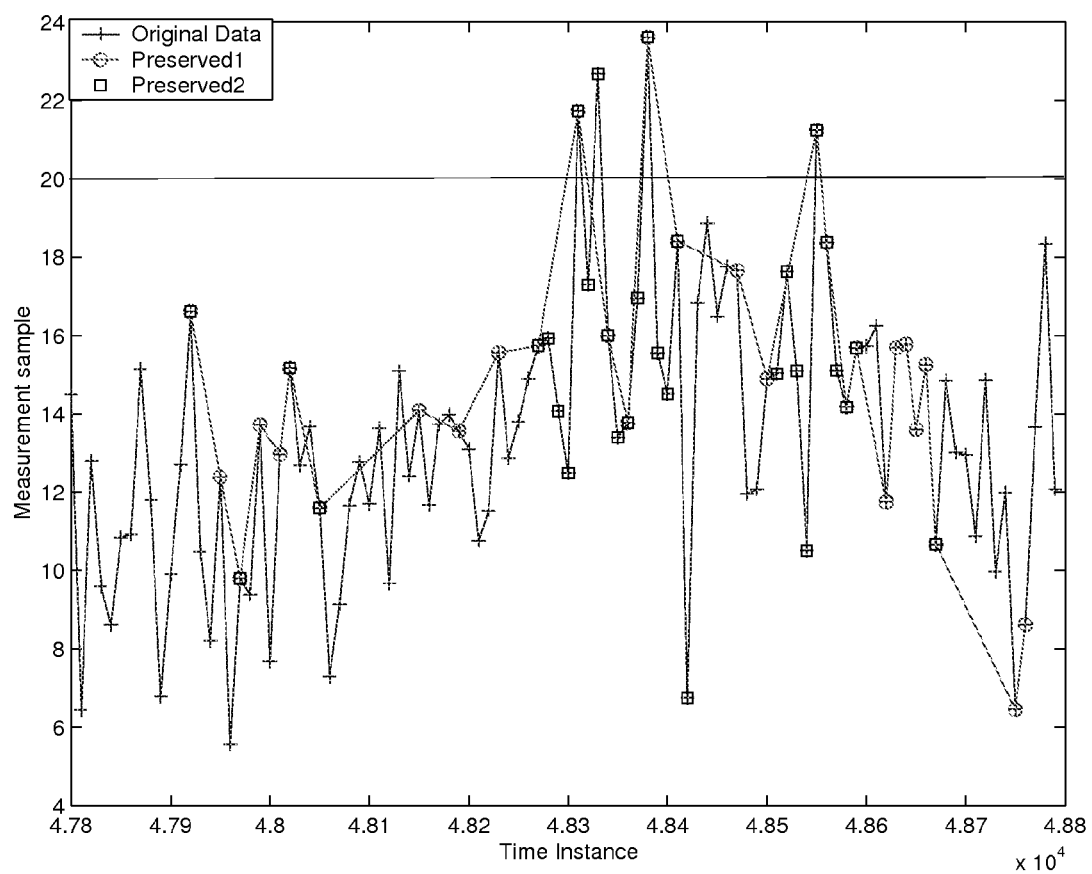

FIG. 4C demonstrates the use of the region of interest model to perform adaptive sub-sampling, i.e. a larger number of samples are preserved closer to events. Plot 'Preserved1' shows the advantage of using the region of interest model as compared to plot 'Preserved2' where the region of interest model is not used.

Computer Hardware Embodiment

Figure 5:
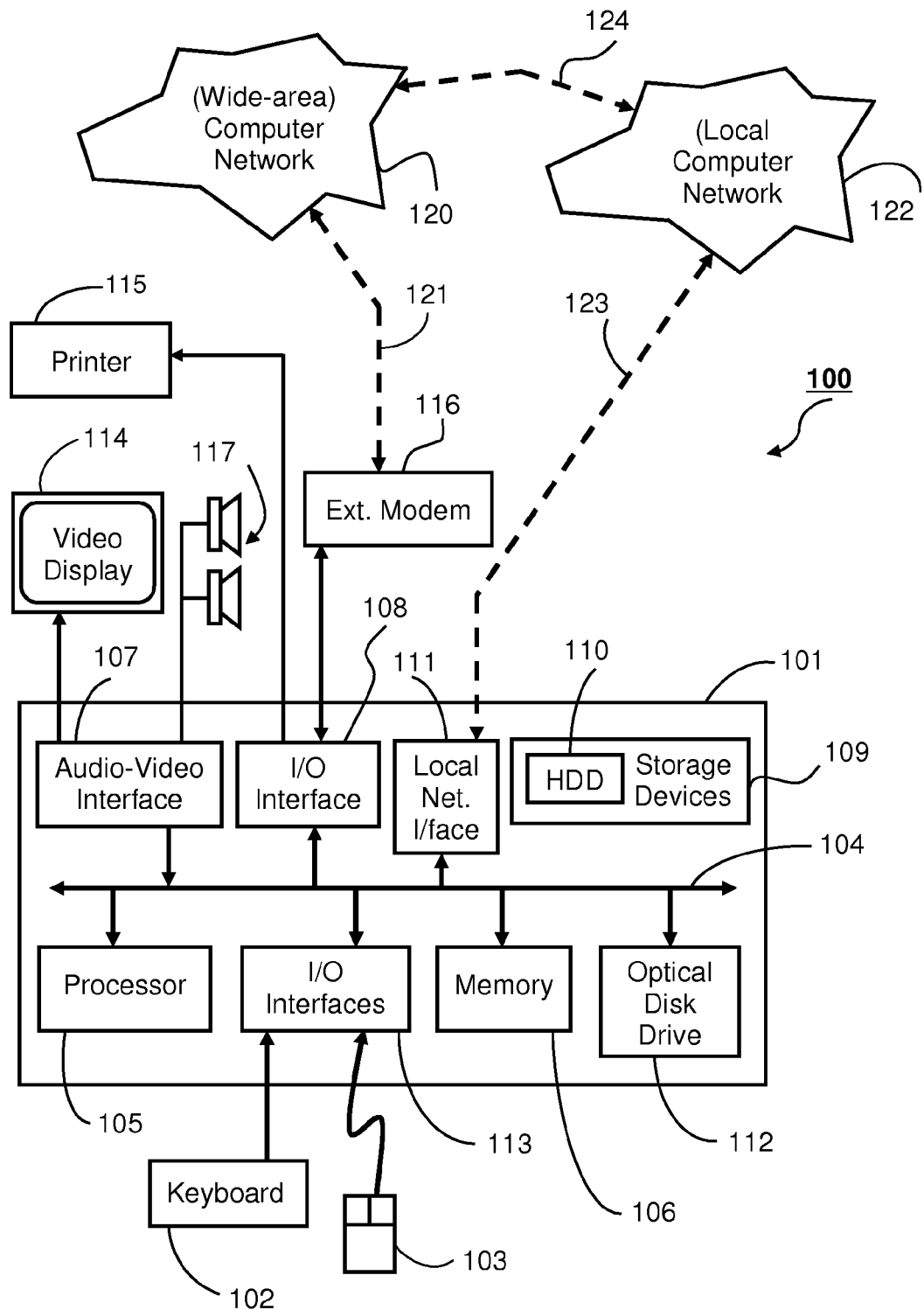
FIG. 5 shows a computer hardware embodiment upon which the invention can be implemented.

The method of FIGS. 1 and 2 may be implemented using a computer system 100, such as that shown in FIG. 5 wherein the processes of FIGS. 1 and 2 may be implemented as software, such as one or more application programs executable within the computer system 100. In particular, the steps of method of purging monitoring data are effected by instructions in the software that are carried out within the computer system 100. The instructions may be formed as one or more code modules, each for performing one or more particular tasks. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer system 100 preferably implements an advantageous apparatus for purging stored monitoring data.

As seen in FIG. 5, the computer system 100 is formed by a computer module 101, input devices such as a keyboard 102 and a mouse pointer device 103, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or similar functionality. The interface 111 may be formed by an Ethernet™ circuit card, a wireless Bluetooth™ or an IEEE 802.21 wireless arrangement. The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105, to 113 of the computer module 101 typically communicate via an interconnected bus 104 and in a manner which results in a conventional mode of operation of the computer system 100 known to those in the relevant art. Examples of computers on which the described arrangements can be practised include IBM-PCs and compatibles, Sun Sparcstations, Apple Mac™ or alike computer systems evolved therefrom.

Typically, the application programs discussed above are resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable media refers to any storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

CONCLUSION

Various alterations and modifications can be made to the techniques and arrangements described herein, as would be apparent to one skilled in the relevant art.

We claim:

1. A computer-implemented method for purging timeseries data samples stored in a repository, said method comprising:
   calculating, by a computer, a utility value for each data sample of a measurement timeseries and an event timeseries, respectively, of monitored IT infrastructure elements,
      wherein a calculation of said utility values is based on a dependency model being represented as a hierarchical graph having (i) nodes, and (ii) edges among nodes of a same level of said hierarchical graph, and each said measurement and event timeseries being associated with a node,
      wherein said event timeseries has a dependency relationship to said measurement timeseries, and
      wherein said measurement and event timeseries are segmented into time windows of a fixed size and window boundaries are synchronized for said measurement and event timeseries;
   changing, by said computer, said utility values of all data samples assigned to selected windows in said measurement and event timeseries within a temporal distance of an event that occurs in said event timeseries;
   determining, by said computer, an information content and an average utility value of each said data sample in each of said selected windows,
      wherein said determining of said information content of each said data sample is performed on the basis of using one of a probability distribution function, a mean square error, and a Kullback Liebler distance applied to said data samples; and
   purging, by said computer, said data samples from each of said selected windows that are to be stored in said repository of fixed size, such that said data samples having high utility value are retained and loss of said information content of retained data samples is minimized,
      wherein said number of data samples in said selected windows to be stored in said repository is proportional to a product of said average utility and said information content of said data samples in said selected windows, divided by a sum of products of an average utility and an information content for all windows of said measurement and event timeseries.

2. The method of claim 1, wherein said purging also ensures that a maximum capacity of said repository is not exceeded.

3. The method of claim 1, wherein said utility value calculation is based on regions of said data samples of interest.

4. The method of claim 1, wherein said utility value calculation is based on age of said data samples.

5. The method of claim 4, wherein said age is determined by a polynomic function.

6. A computer system for purging timeseries data samples stored in a repository, said system comprising:
   a repository that stores measurement timeseries and event timeseries data samples; and
   a processor configured to:
      calculate a utility value for each data sample of a measurement timeseries and an event timeseries, respectively, of monitored IT infrastructure elements,
         wherein a calculation of said utility values is based on a dependency model being represented as a hierarchical graph having (i) nodes, and (ii) edges among nodes of a same level of said hierarchical graph, and each said measurement and event timeseries being associated with a node,
         wherein said event timeseries has a dependency relationship to said measurement timeseries, and
         wherein said measurement and event timeseries are segmented into time windows of a fixed size and window boundaries are synchronized for said measurement and event timeseries;
      change said utility values of all data samples assigned to selected windows in said measurement and event timeseries within a temporal distance of an event that occurs in said event timeseries;
      determine an information content and an average utility value of each said data sample in each of said selected windows,
         wherein determining of said information content of each said data sample is performed on the basis of using one of a probability distribution function, a mean square error, and a Kullback Liebler distance applied to said data sample; and
      purge said data samples from each of said selected windows that are to be stored in said repository of fixed size, such that said data samples having high utility value are retained and loss of said information content of retained data samples is minimized,
         wherein said number of data samples in said selected windows to be stored in said repository is proportional to a product of said average utility and said information content of said data samples in said selected windows, divided by a sum of products of an average utility and an information content for all windows of said measurement and event timeseries.

7. The system of claim 6, wherein said purging also ensures that a maximum capacity of said repository is not exceeded.

8. The system of claim 6, wherein said utility value calculation is based on regions of said data samples of interest.

9. The system of claim 6, wherein said utility value calculation is based on age of said data samples.

10. A non-transitory computer program storage medium, readable by a computer, tangibly embodying a computer program of instructions executable by said computer to perform a method for purging timeseries data samples stored in a repository, said method comprising:

calculating a utility value for each data sample of a measurement timeseries and an event timeseries, respectively, of monitored IT infrastructure elements, wherein a calculation of said utility values is based on a dependency model being represented as a hierarchical graph having (i) nodes, and (ii) edges among nodes of a same level of said hierarchical graph, and each said measurement and event timeseries being associated with a node, wherein said event timeseries has a dependency relationship to said measurement timeseries, and wherein said measurement and event timeseries are segmented into time windows of a fixed size and window boundaries are synchronized for said measurement and event timeseries;

changing, by said computer, said utility values of all data samples assigned to selected windows in said measurement and event timeseries within a temporal distance of an event that occurs in said event timeseries;

determining an information content and an average utility value of each said data sample in each of said selected windows, wherein said determining of said information content of each said data sample is performed on the basis of using one of a probability distribution function, a mean square error, and a Kullback Liebler distance applied to said data samples; and purging said data samples from each of said selected windows that are to be stored in said repository of fixed size, such that said data samples having high utility value are retained and loss of said information content of retained data samples is minimized, wherein said number of data samples in said selected windows to be stored in said repository is proportional to a product of said average utility and said information content of said data samples in said selected windows, divided by a sum of products of an average utility and an information content for all windows of said measurement and event timeseries.

11. The method of claim 1, wherein said event timeseries denotes a Boolean value associated with either a normal or a problem state.

12. The system of claim 6, wherein said event timeseries denotes a Boolean value associated with either a normal or a problem state.

13. The method of claim 10, wherein said event timeseries denotes a Boolean value associated with either a normal or a problem state.

14. The method of claim 1, wherein said information content is calculated by one of a variance, an entropy, and a histogram of values of said data samples.

15. The system of claim 6, wherein said information content is calculated by one of a variance, an entropy, and a histogram of values of said data samples.

16. The method of claim 10, wherein said event timeseries denotes a Boolean value associated with either a normal or a problem state.

17. The method of claim 10, wherein said purging also ensures that a maximum capacity of said repository is not exceeded.

18. The method of claim 10, wherein said utility value calculation is based on regions of said data samples of interest.

19. The method of claim 10, wherein said utility value calculation is based on age of said data samples.

20. The method of claim 19, wherein said age is determined by a polynomic function.

* * * * *